Figure 1:
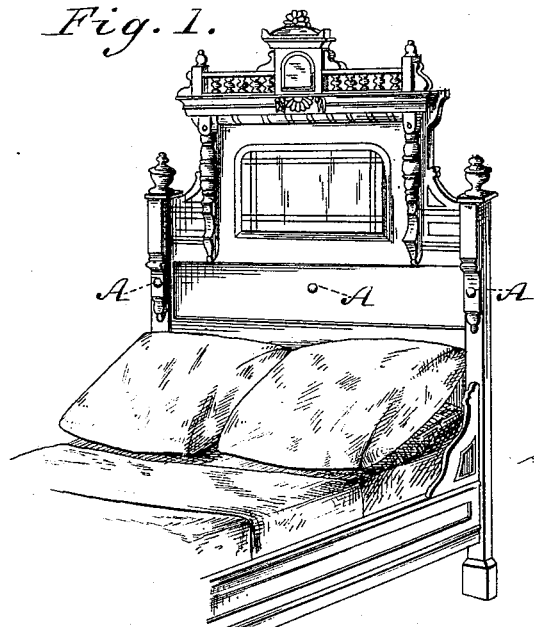

(No Model.) 2 Sheets—Sheet 1.

H. L. GOODWIN.
FURNITURE.

No. 326,730. Patented Sept. 22, 1885.

WITNESSES:

INVENTOR:
Henry L. Goodwin (No Model.) 2 Sheets—Sheet 2.

H. L. GOODWIN.
FURNITURE.

No. 326,730. Patented Sept. 22, 1885.

WITNESSES:
John E. Deemer
Geo. S. Lester

INVENTOR:
Henry L. Goodwin

United States Patent Office.

HENRY L. GOODWIN, OF NEW YORK, N. Y.

FURNITURE.

SPECIFICATION forming part of Letters Patent No. 326,730, dated September 22, 1885.

Application filed July 22, 1885. (No model.)

*To all whom it may concern:*

Be it known that I, HENRY L. GOODWIN, of the city of New York, county and State of New York, have invented certain useful Improvements in Furniture, of which the following is a full, clear, and exact description.

My invention relates to that class of household furniture—bedsteads, sofas, and chairs, for instance—to which fancy draperies—such as pillow-shams and tidies—are attached.

Pillow-shams often are pinned directly to the head-boards of bedsteads; but the hardness of the wood resists sufficient entrance of the pins into it by pressure of the fingers to afford a secure fastening for the shams, and pins so applied make punctures in the wood, which greatly mar the design and finish of the bedstead. Pillow-shams have also been held to bedsteads by a variety of frames, forms, rollers, and metal clasps, most or all of which devices are expensive and present an uncomely appearance when the pillow-shams are not applied over them, and also collect dust, and are more or less difficult to operate or adjust.

A common practice in attaching tidies to upholstered sofa and chair backs and arms has been to pin the tidies to the upholstery coverings, which damages said coverings, especially the finer ones, and the intentionally soft upholstery usually will not hold with sufficient firmness either straight or spiral pins passed into it, and the points of pins passed up and down flatwise through the coverings often protrude to injure clothing and hurt the occupants of the sofa or chair. The attachment of tidies to unupholstered sofa and chair backs has been still more difficult, and the usual practice has been to attach the tidies to them by means of cords or tapes, which dangle about and are unsightly.

It is the object of my invention to obviate the above-named disadvantages, while providing a very simple, inexpensive, and effective means of attaching the pillow-shams and tidies to the furniture.

The invention consists in plugs or blocks of a softer material than the frames of the articles of furniture, inserted in or attached on the exposed faces of the frames of the furniture, as will be hereinafter fully described and claimed.

The cushion plugs or blocks are to be made of any suitably incased or pressed material, preferably finished on the ends with a covering of cloth, velvet, silk, or other fabric of any desired color to match or contrast with the bedstead head-board or trimmings, or the sofa and chair frames, or their upholstery-coverings. Said plugs or blocks will be compressed sufficiently to allow ordinary straight or spiral pins to be passed into them by pressure of the fingers, and so as to hold the pins securely in place when inserted—that is to say, the plugs or blocks will be softer than the furniture-frames and harder than ordinary upholstery applied to the frames.

Figure 2:
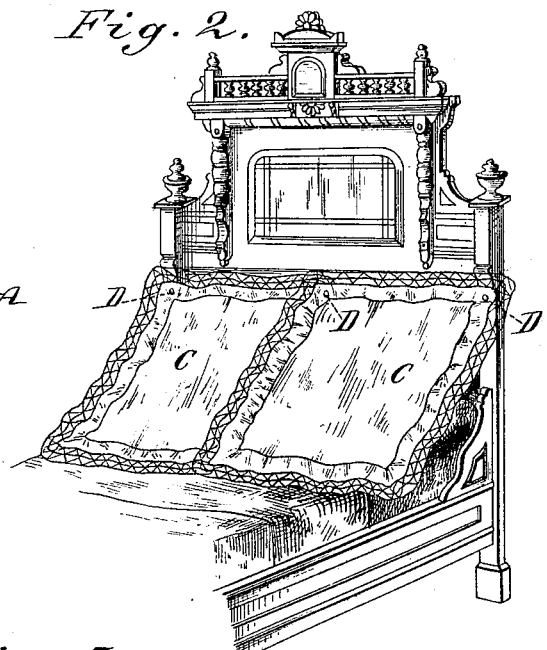
Figure 3:
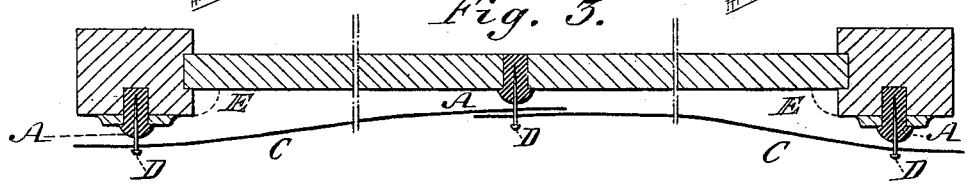
Figure 4:
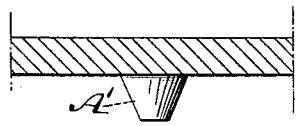
Figure 5:
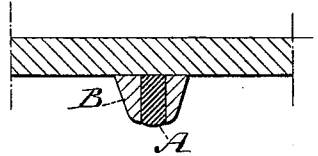
Figure 6:
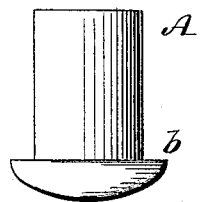
Figure 7:
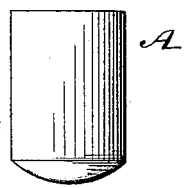
Figure 8:
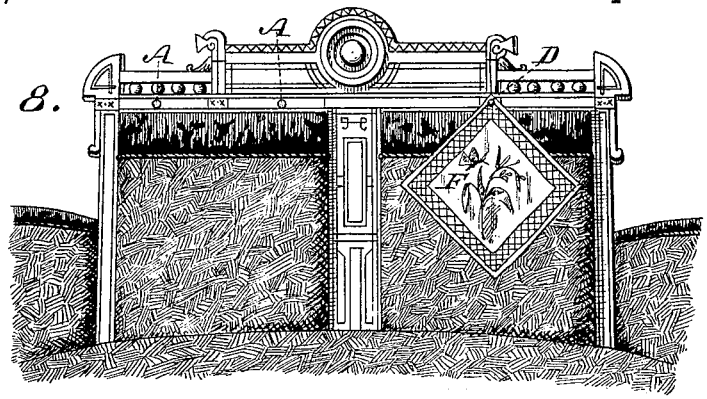
Figure 11:
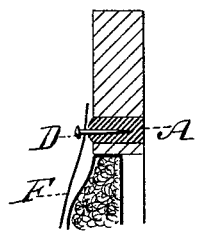
Figure 9:
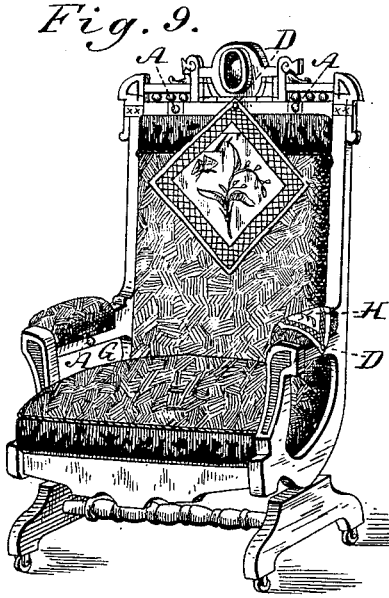
Figure 12:
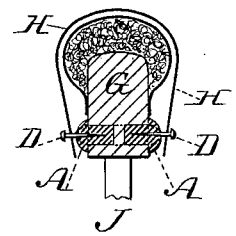
Figure 13:
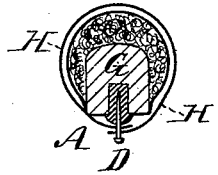
Figure 14:
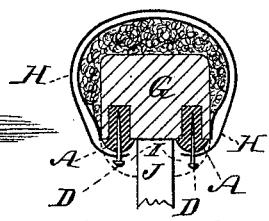
Figure 15:
Figure 10:
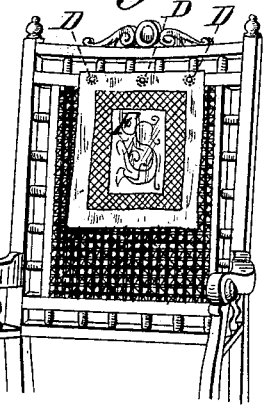
Figure 16:

Reference is to be had to the accompanying drawings, forming a part of this specification, and in which Figure 1 is a perspective view of the head portion of a bedstead with the pillow-shams removed. Fig. 2 is a like view with the pillow-shams attached. Fig. 3 is an enlarged sectional plan view of the bedstead head-board with the shams attached and partly broken away. Figs. 4 and 5 are detail sectional plan views of the central part of a bedstead head-board. Figs. 6 and 7 are respectively side views of headed and headless plugs adapted to bedsteads and drawn full size. Fig. 8 shows the back of a sofa with one tidy attached. Fig. 9 is a perspective view of an arm-chair with tidies held to its back and one arm. Fig. 10 shows a caned chair-back with a tidy attached. Fig. 11 is a detail vertical sectional side elevation of an upholstered sofa or chair back with a tidy attached. Figs. 12, 13, and 14 are detail cross-sectional elevations of chair-arms with tidies attached; and Figs. 15 and 16 are respectively side elevations of headed and headless plugs adapted to sofas and chairs, and drawn full size.

I first refer to Figs. 1 to 7, inclusive, of the drawings, wherein the letters A indicate plugs which are attached to the head-board of the bedstead, one at each side post and one between the side posts, three plugs being deemed sufficient when two pillow-shams are used. I prefer to make the plugs in cylindrical form and with heads $a$, as in Fig. 6, so that they may be applied to the bedstead by boring holes in the head-board with a common bit or drill and inserting them in the holes—with or without glue—until the shoulders $b$ of their heads $a$ strike the head-board; but the headless plugs shown in Fig. 7 may be used, and, if desired, the center device may consist of a truncated cone-shaped cushion-block, as at A' in Fig. 4, or one of the headed or headless plugs may be inserted in a rosette or ornament, B, as in Fig. 5; or three half-round or cone-shaped cushion-blocks may be used, and be glued, screwed, or otherwise attached to the bedstead head-board; but usually I will employ the three headed plugs, as shown in Fig. 3.

As clearly represented in Figs. 2 and 3, the pillow-shams C C are attached to the bedstead by passing ordinary straight pins D once and directly through the shams into the plugs A, the two shams being lapped one over the other at the center plug, whereby one pin passed into each plug holds both shams securely and smoothly to place, and so they cannot accidentally be displaced by drafts of air or otherwise.

When the bedstead head-board is low, the plugs will be placed at or near its top, or may be set on or into the top edge of the head-board, a single central plug being preferred for narrow or single beds and crib and cradle beds, which usually have low head-boards and are made up with a single pillow and pillow-sham.

I show in dotted lines at E E, Fig. 3, cushion-blocks set at the angles between the side posts of the head-board and its panel, which blocks may be used instead of the set-in side-post plugs A; but the latter are preferred, as no open joints are liable to occur around them by the shrinking of the wood, in which joints dust might lodge.

I now refer to Figs. 8 to 16, inclusive, of the drawings.

At the right-hand panel of the sofa-back, Fig. 8, I show a tidy, F, hung from one corner by a pin, D, passed through the tidy into a headless plug, A, set into the center of the back frame-bar directly above the upholstery coverings over which the tidy hangs, as seen also in Fig. 11. I show two plugs A set into the frame-bar of the left-hand sofa-back panel, to which a tidy may be hung squarely by pins D, passed through one edge of the tidy into each of the plugs.

In Fig. 9 three plugs A are inserted in the chair-back frame next the upholstery coverings, which will allow tidies F to be hung diagonally and centrally on the chair-back, as shown, by a pin, D, passed into the center plug, or squarely by pins passed into the two outer plugs or into all three plugs.

In Fig. 10 is shown a tidy, F, held squarely to a caned-back chair by passing pins D through the tidy into three plugs, A, (dotted,) set into the frame-bar just above the caning of the back.

I show in Fig. 9, and in enlarged cross-sectional view in Fig. 12, headless plugs A set into the sides of the arm frame or block G of a chair, whereby a tidy, H, may be held to the arm by pins passed through its opposite corners or edges into the plugs, a tidy being applied to the left arm only of the chair, the better to show the plug at the inside face of its right arm. When the arm-frame or block G is thin, one plug A may be passed entirely through the arm, as shown in dotted lines in Fig. 12, and the opposite tidy-attaching pins D will be crossed or lapped past each other in the body of the plug, as will readily be understood. When the arm frame or block G of a chair or sofa is thin vertically, and the upholstery covering reaches quite down to its lower edge, I will insert a headed plug, A, upward into the arm from its under side, so that opposite ends of a tidy, H, may be lapped on each other over the head or end of the plug, and be fastened to it by a single pin, D, as in Fig. 13, and which often will be the preferred position of the plug in any size of arm-frame, as the plug A and pin D are out of sight. When the arm frame or block G is heavy or broad, a plug, A, may be set up into it from the bottom near both its edges, so that opposite corners or edges of a tidy, H, may be attached, one to each plug, by pins D D, as in Fig. 14, where is shown also in dotted lines at I I how cushion-blocks of angular or quarter-spherical shape may be fastened at the angles between the arm-block G and the arm or side J of the chair; but the set-in plugs A are preferred, as they closely fit the bore made in the arm-frame to receive them, and do not collect dust in the joints around them. When the arm-frame G is of considerable length, two plugs, A—either headed or headless—may be used at each side or at the bottom face of the arm instead of a single plug attached at the lengthwise center of the arm, as above described.

Projecting pads or blocks may be fastened to the faces of the sofa and chair back frames next the upholstery or caning in the positions above described for the plugs to pin tidies to; but such pads or blocks would be likely to mar the design of the sofa and chair frames and break off easily; hence the inserted plugs are preferred.

By the use of cushion plugs or blocks applied as above described the tidies may securely be attached by pins to upholstered or unupholstered sofa and chair back frames without concealing the ornamental carvings or finish of the heads of said frames, and the plugs or blocks may be applied to both the back and arm frames of sofas or chairs or renewed when worn at a trifling cost.

It is evident that my improvements are applicable to new or old furniture.

I do not claim as my invention, broadly, the attachment of cushion plugs or blocks to articles of wood or metal in general, and my invention is not to be confounded with those improvements wherein cushion blocks or pads have been fastened at the backs of furniture-frames to serve as wall stops or buffers, or wherein fabric plugs have been inserted in bobbin-holders or lap-boards to serve as pin-cushions.

Having thus fully described my invention, I claim as new and desire to secure by Letters Patent—

1. The combination, with the frame of a piece of furniture, of plugs or blocks attached thereto and adapted to receive pins for securing pillow-shams, tidies, &c., in their usual positions to said frame, substantially as herein set forth.

2. The combination, with the back-frame of a piece of furniture—such as a bedstead, sofa, or chair—of plugs or blocks made of softer material than the back-frame, and attached to the frame and adapted to receive pins for securing pillow-shams or tidies to the furniture, substantially as herein set forth.

3. The combination, with the back and arm frames of a piece of furniture—such as a sofa or chair—of plugs or blocks made of softer material than the back and arm frames, and attached thereto and adapted to receive pins for securing tidies to said back and arm frames, substantially as herein set forth.

HENRY L. GOODWIN

Witnesses:
EMMA C. GOODWIN,
EDGAR TATE.